Figure 1:
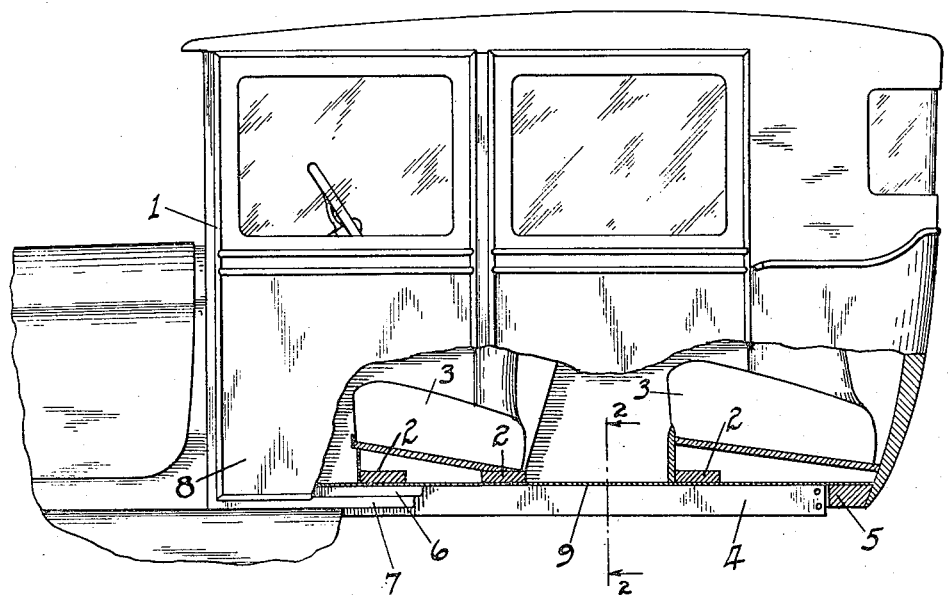

Jan. 6, 1925

H. C. MILLS

AUTOMOBILE BODY

Filed June 14, 1924

1,521,825

INVENTOR
Horace C. Mills
by
Owen, Owen & Crampton.

Patented Jan. 6, 1925.

1,521,825

UNITED STATES PATENT OFFICE.

HORACE C. MILLS, OF DETROIT, MICHIGAN, ASSIGNOR TO PENFIELD-MILLS-SHEARMAN CORP., OF JAMESTOWN, NEW YORK, A CORPORATION OF NEW YORK.

AUTOMOBILE BODY.

Application filed June 14, 1924. Serial No. 719,940.

*To all whom it may concern:*

Be it known that I, HORACE C. MILLS, a citizen of the United States, and a resident of Detroit, in the county of Wayne and State of Michigan, have invented a new and useful Automobile Body, which invention is fully set forth in the following specification.

My invention has for its object to provide an automobile body that is so constructed that it will be well supported and secured to the chassis of an automobile, and yet which may be placed or hung exceedingly low relative to the chassis frame. A particular object of the invention is to provide bodies of either open or closed types that may be so placed on a Ford chassis such that the floor level of the body will be substantially at the level of the upper sides of the side bars of the chassis frame. It is well known that two or three inches in the height of the floor of an automobile body makes a very great difference in the appearance, and moreover it makes a great difference in the security of the machine when driven. These differences make a great difference in the salability of the body.

The invention may be contained in bodies of different forms and the bodies may be connected to chassis of different makes. To illustrate a practical application of the invention, I have shown in the drawings a sedan or four-seated coupé supported on a frame substantially like that found in the Ford chassis. The construction shown in the drawings is described hereinafter.

Figure 1 of the drawings illustrates a side view of the body and a part of the frame, a part of the body being shown broken away.

Figure 2:
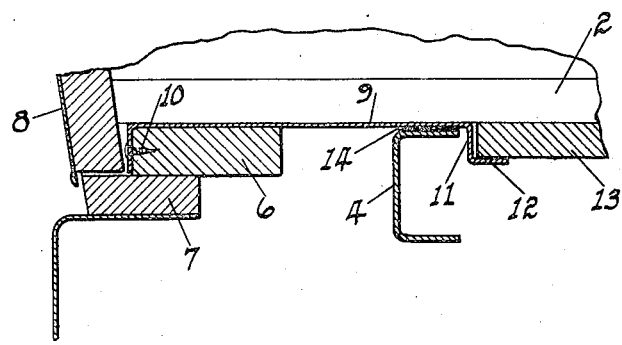

Figure 2 illustrates a sectional view taken on the line 2—2.

The body 1, as shown in the figures, is provided with supporting cross bars or beams 2 that are located under the seats 3 of the automobile. The beams 2 extend across the side bars 4 of the chassis frame and thus the beams 2 support the entire weight of the body. The beams 2 are bolted to the side bars 4 in the manner well known in the art, to secure the body 1 to the frame of the chassis. The rear of the body may be provided with a cross piece 5 and the sides with longitudinal beams 6 and 7 that extend along the lower side corners of the body and form the sill and part of the door jamb. The parts 5, 6 and 7 form parts of the skeleton or frame of the body and are suitably connected to the uprights of the framework of the structure. The longitudinal beams 6 are suitably connected, as by bolts, to the supporting beams 2. The doors 8 are hingedly connected to suitable uprights and swing over the beams 7, the beams 7 acting as sills to the doors 8. Thus, the lower edges of the doors are located below the level of the upper side of the side bar 4 of the chassis frame, while in the ordinary automobile body the cross supporting beams are located below the longitudinal beams of the frame, which raises the lower edges of the doors above the level of the upper sides of the side bars of the chassis frame to a height equal to the thickness of these two sets of beams plus the thickness of the floor, except in certain cases where the longitudinal beams are rabbeted to receive the ends of the floor boards.

In order to support the floor boards, and in order to provide a floor between the longitudinal beams 6 and the side bars of the chassis frame, plates 9 are located in front of the seats 3 and so as to cover the beams 6 and 4 and the space between the beams. If desired, the plates 9 may extend substantially the length of the automobile as shown in Fig. 1. The plates 9 are bent over the edges of the beams 6 that form the door jambs along the lower edges of the doors and may be secured to the beams 6 in any suitable manner, such as by the screws 10. The opposite side edges of the plates 9 are depressed and the edge portions are bent in the form of a Z-bar, that is, the edge portions of the plates 9 are provided with depending flanges having depending portions 11 and laterally extending portions 12. The floor boards 13 are placed upon the laterally extending portions 12 of the plates 9, the construction being such as to place the level of the floor boards flush with the level of the plate. Thus, the flooring of the automobile is formed by the plates 9 and the floor boards 13. This places the floor substantially at the level of the upper sides of the side bars of the frame of the chassis. If desired, suitable resilient strips 14 are located between the plates 9 and the side bars 4 to prevent rattling. in the manner well known in the art.

I have thus provided an exceedingly simple and yet efficient supporting structure, whereby automobile bodies may be materially and effectively lowered relative to the frame of the automobile chassis, that greatly improves the appearance and at the same time greatly increases the safety of the automobile, since it lowers very materially the center of gravity of the body.

I claim:

1. In an automobile body, a plurality of supporting cross beams, a pair of longitudinal side beams forming the door jambs and sills of the doors of the automobile body and secured to the under sides of the supporting cross beams, plates extending across the tops of the longitudinal beams and the side bars of the chassis frame, and having depending and laterally extending flanges, floor boards supported by the flanges of the plates.

2. In an automobile body, a plurality of supporting cross beams located under the seats of the automobile body, a pair of longitudinal side beams forming the door jambs and sills of the doors of the automobile body and secured to the under sides of the supporting cross beams, plates extending across the tops of the longitudinal beams and the side bars of the chassis frame, and having depending and laterally extending flanges, floor boards supported by the flanges of the plates.

In testimony whereof, I have hereunto signed my name to this specification.

HORACE C. MILLS.